United States Patent [19]

Fisch et al.

[11] Patent Number: 5,598,272
[45] Date of Patent: Jan. 28, 1997

[54] VISUAL CALIBRATOR FOR COLOR HALFTONE IMAGING

[75] Inventors: Richard S. Fisch, St. Paul; David A. Larshus, Maplewood; John A. Sands, Oakdale; Mark E. VerMurlen, White Bear Township, Ramsey County, all of Minn.

[73] Assignee: Imation, Inc., Oakdale, Minn.

[21] Appl. No.: 224,322

[22] Filed: Apr. 7, 1994

[51] Int. Cl.$^6$ .............................. H04N 1/40; H04N 1/46; G03F 3/08
[52] U.S. Cl. ..................... 358/298; 358/504; 358/518
[58] Field of Search ................................ 358/298, 296, 358/406, 501–504, 515, 518, 520, 527, 534; 347/19, 43, 184; 355/77, 204, 208; 382/162, 167, 319

[56] References Cited

U.S. PATENT DOCUMENTS

| | | | |
|---|---|---|---|
| 4,166,701 | 9/1979 | Miller | 355/77 X |
| 4,877,580 | 10/1989 | Aronowitz et al. | 422/58 |
| 5,081,529 | 1/1992 | Collette | 358/504 |
| 5,255,085 | 10/1993 | Spence | 358/527 |
| 5,296,947 | 3/1994 | Bowers | 358/527 |
| 5,335,096 | 8/1994 | Shimazaki | 358/518 |
| 5,339,176 | 8/1994 | Smilansky et al. | 358/504 |
| 5,416,613 | 5/1995 | Rolleston et al. | 358/518 |

*Primary Examiner*—Peter S. Wong
*Assistant Examiner*—Eric Frahm
*Attorney, Agent, or Firm*—Caroline A. Bates; Susan M. Zerull; Arlene K. Musser

[57] ABSTRACT

A visual calibrator for a digital color imaging proof system includes a series of patches on a carrier layer, the patches composed of combinations of at least two colors in halftone or continuous print, and associated with at least some of the patches are alphanumeric markings which relate to specific changes in an imaging signal for adjustment of the imaging system to modify the color of a proof towards a desired target color.

20 Claims, 2 Drawing Sheets

VISUAL CALIBRATOR FOR COLOR HALFTONE IMAGING

BACKGROUND OF THE INVENTION

1. Field of the Invention

The present invention relates to the field of proofing, more particularly to the field of proofing with digital imaging, especially thermal transfer media and ink jet media, and most particularly to the field of visually calibrating proofs made by digital generation of colors.

2. Background of the Art

Prepress proofing of printed images is intended to provide a printer with a simulation or estimate of an image which is to be printed. This simulation is prepared off the press, rather than going through the expensive and timely procedure of dedicating the press to an actual run to qualitatively evaluate the accuracy of printing plate exposures.

Proofing operates by using a set of color separations (physical or electronic) which will ultimately be used to expose a printing plate to generate a printed image. The same set of color separations is used to generate the proof. At present, there are certain media which are specifically designed to simulate the image which would be produced on press by the data used in generating the proof. Even features uniquely characteristic of on press proofing can be built into the proof (e.g., dot gain, etc.).

It is most common for the proof image to be directly compared with the original image or the original individual color separations to compare results. The trained eye of the printer will suggest different levels of exposure to more properly reflect actual tones, hues and densities of the original image. In certain types of proofing, particularly digital proofing when accessing electronic data, there can be both variations in the proofing materials (lot to lot variations, for example), and there may not be an original image (other than the electronic data) to work from. This can complicate the job of the printer in determining how much alteration of the imaging process must be effected to perfect the proof image.

SUMMARY OF THE INVENTION

A visual calibration table is described in which specific target images (combining at least two and up to four or more color separations) are prepared for comparison with a proofing calibration chart. The target images are placed against a visual calibration scale which has at least four (and as many others as reasonably desired, such as five, six, eight, ten, twelve, fourteen, sixteen, twenty-four, etc.) preprinted images having both color content (of said at least two or more colors) and specific directions for evaluation of the electronic data (or reference alphanumerics to a separate or associated look-up table) to alter the exposure (i.e., the operation or radiation emission of the electronic proofer) to produce the specifically desired tone, hue, and/or density desired for the image.

DETAILED DESCRIPTION OF THE INVENTION

Figure 1:
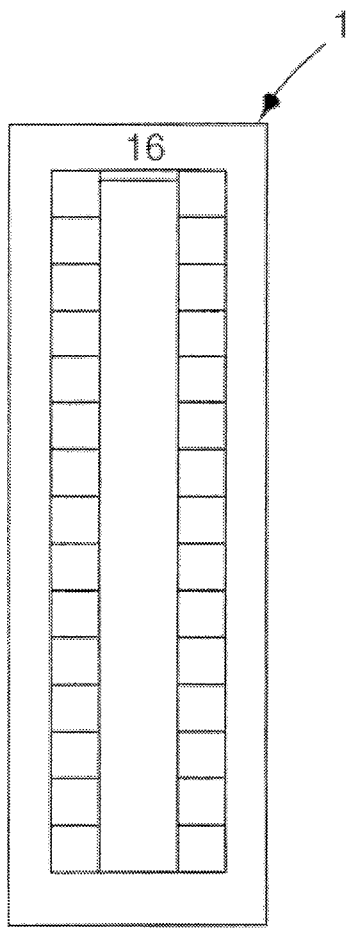
FIG. 1 shows a visual calibrator 1 of the present invention.

A visual calibrator is provided for use with electronically driven imaging systems such as thermal transfer proofing systems which provides the printer or printshop worker with specific information on how to accurately adjust the imaging procedures to reach the objective colors, hues, tones and densities on proofs and printed images. The visual calibrator consists of a sheet (either transparent or opaque, depending, for example, upon the ultimate printed surface to be used) which has a series of patches of mixed colors in either continuous tone or half tone format, preferably (e.g., at least two selected from a) cyan, magenta, yellow, and black, or b) red, yellow, green and black, or c) non-traditional colors such as white, pink, aqua, etc.). Each series of patches corresponds to a single intensity signal used with the thermal printing device on which the proof is generated. For example, assuming that a printer has 256 gray levels, there may be series of patches corresponding to gray levels 16, 64, 128, 200, and 256, etc. The particular values selected to represent energy and intensity are chosen arbitrarily (or at particularly common levels of exposure) to give the operator better control of the particular proofing system being used, but it is desirable to have the values somewhat spread out along the continuum of energy level output for the imaging system.

Each series of patches for a single energy output (herein called a single output chart) has numerous patches thereon with predetermined color content therein. The single output chart is to be compared with not only an energy output, but also a specific target color (e.g., predetermined combination of at least two of the colors used in the proofing system, e.g., usually selected from cyan, magenta, yellow, and black, but the chart may be designed for any specific colors). The proof image is placed adjacent to the patches on the single output chart and the closest visual match is determined. Associated with each of the patches are alphanumerics which either specifically contain directions as to how the imager should be adjusted to reach the target color, or directions to a look-up table which contains the specific instructions for modification of the signals from the imager to reach the target color. As both the target intensity of exposure and the target color are predetermined for each single output chart, corrections can be standardized for each patch. As noted, the corrections may be on the support itself for the single output chart or in an associated look-up table.

The corrections can be in the form of specific instrument instructions or recalibrations. For example, in the 3M Rainbow™ Desktop Color Proofing System, specific instructions such as 2Y, 3C, 1M, and 0B would identify the specific alterations in the balance of the system for each of the four colors normally used in the system, with Y representing Yellow, C Cyan, M magenta, and B Black. Each proofing system will, of course, have its own identifying corrections which are to be made in the settings of the equipment. These corrections generally adjust either the balance between colors or absolute intensity of the image. It is usually desirable to have one patch which is the exact target color and density intended for the single output chart. With a target patch, it can be determined that no adjustments are necessary. It is convenient to have the target patch located at a readily visible position on the single color output chart, such as the top of the chart, the bottom, or the middle of the chart. The target patch may be larger than the other patches to be easily spotted.

The most preferred embodiment and use of the visual calibrator of the present invention is for use with at least three color electronically driven imaging systems (systems in which the intensity (energy level) of the electronic signal from a data source is proportional to the image density to be generated by the imaging system, e.g., thermal dye transfer, thermal mass transfer, ink jet, etc.) and to use the color patches to control three color (absent black, e.g., cyan magenta and yellow only) gray scale balance. When there are multiple prepared three color visual calibration scales present on a single calibrator sheet (e.g., as in FIG. 3), the alphanumeric directions can provide adjustments for the electronically driven imager which can be varied across various ranges of image and color density.

To facilitate placement of the test proof against the single color output chart, the chart should extend to the edge of the sheet, a cut can be made from the edge of the sheet into the chart, or a hole can be cut into the support sheet carrying the single color output chart so that a test proof can be lain under the carrying sheet and seen against the chart. It is particularly desirable when there is a hole or a deep cut in the sheet carrying the chart to have a second sheet as a support to hold the proof steady. This can be provided, for example, by providing an envelope for the proof to be slid into or by having the carrier sheet fold away from the support sheet. It is possible for the target proof sheet to have the target extend to the edge of the proof so that it may overlay the chart, but this is less preferred.

Because of the physical nature of printing, the proofs may show significant variations between different energy outputs from the thermal imaging system, it is desirable to have more than one single color output chart on a single visual calibrator. For example, there may be two, three, four, six, eight or more charts on a single sheet, each representing a different output level for the thermal imaging device. It might be desirable to have the charts correspond to various significant printing levels (e.g., 3%, 15%, 30%, 50%, 60%, 75%, 80%, and 98%), or the charts may represent totally artificial levels at the designer's discretion. It is reasonable to try to spread the charts out along the energy output range of the thermal imaging system for the imaging medium. The minimum energy level chart and the maximum energy level chart should also be at sufficiently high and sufficiently open density levels so that the human eye can easily perceive the subtle variations in color differences (e.g., above a four percent dot and below a ninety-five percent dot.

Figure 2:
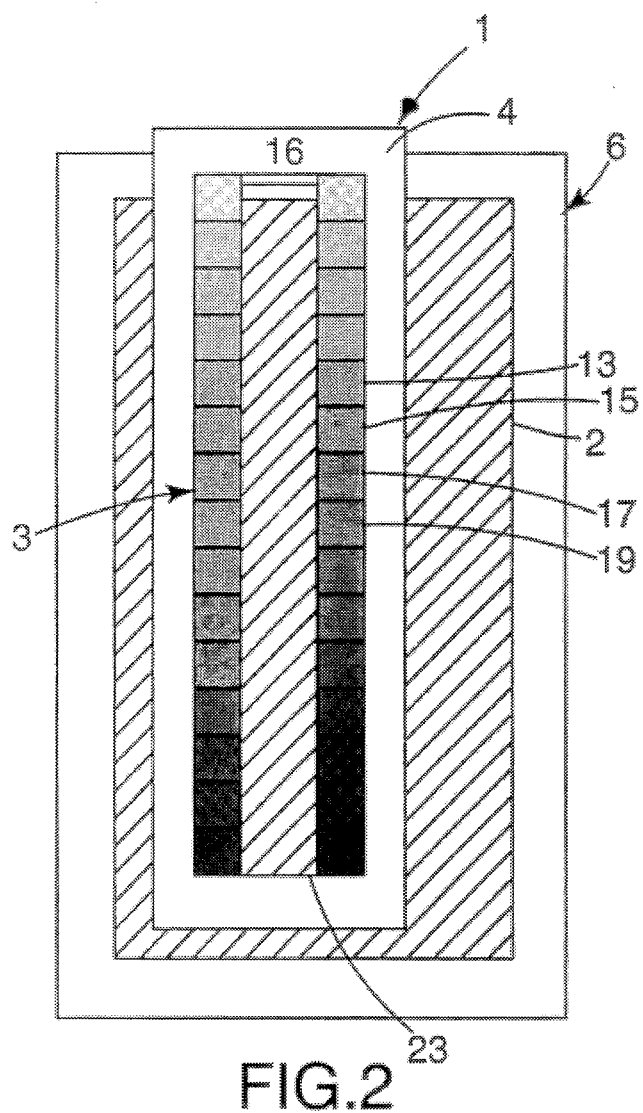
FIG. 2 shows a visual calibrator 1 having a uniformly exposed proof 2 associated therewith.

FIG. 1 shows a visual calibration sheet 1 On single color output chart 3 in FIG. 2 can be seen four separate patches 13, 15, 17, and 19. The four patches are highlighted to show a difference in color, and adjacent to each patch is an artificial example of color correction instructions.

FIG. 2 shows a visual calibrator 1 having a carrier layer 4 with color patches 13, 15, 17, and 19 laying next to a proof 2 which is displayed through a hole 23. The color of the proof 2 is shown as matching the color of patch 15 which indicates a correction (arbitrarily chosen for this example) of 2C, 5M, 0Y and 1B (The numbers are chosen to correspond to settings on the imaging system, which may of course be arbitrarily and non-linearly chosen by the manufacturer). These specific corrections would be read by the printer and entered into the thermal imaging control system to adjust the color of the proof to nearer meet the target color.

Figure 3:
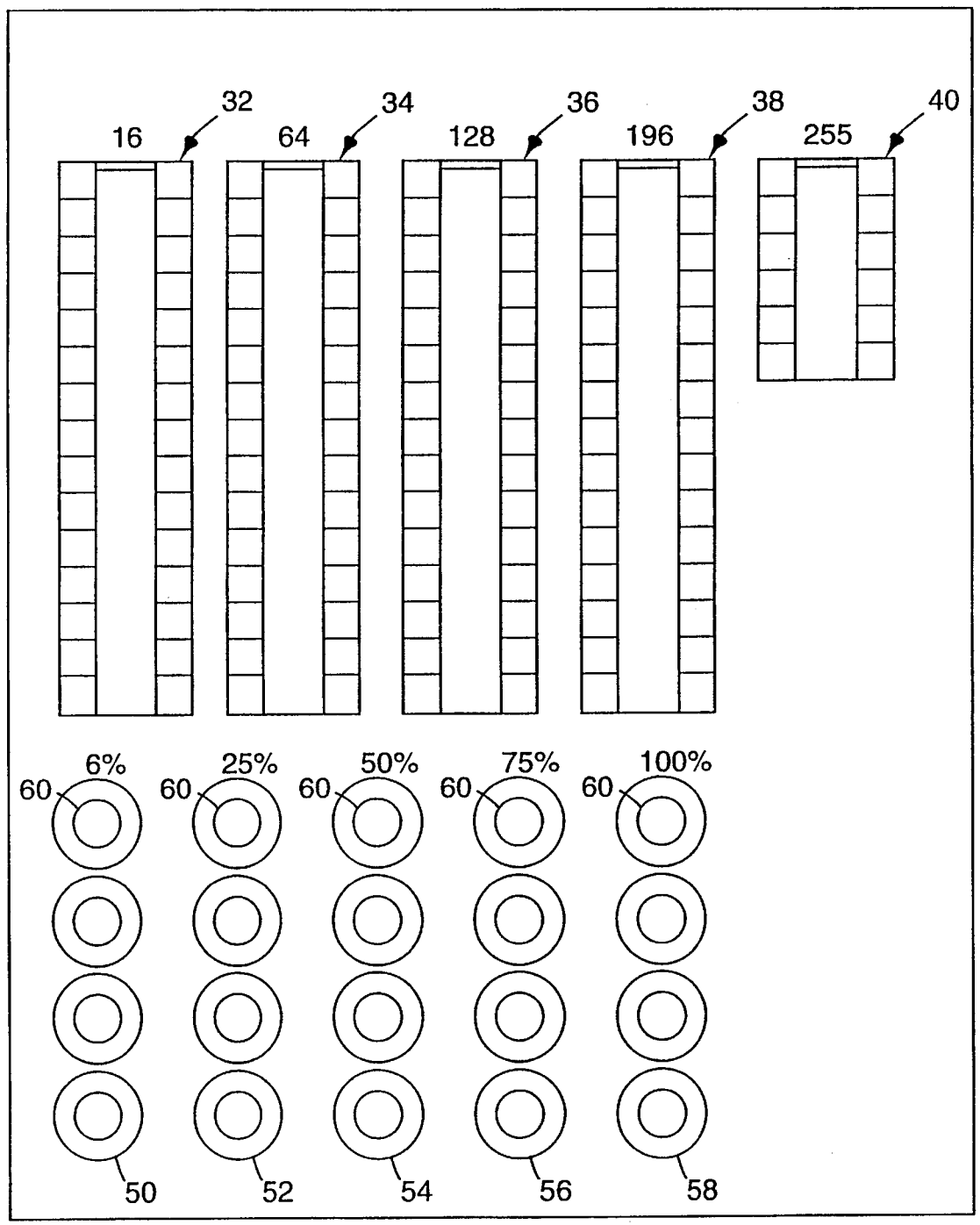
FIG. 3 shows a visual calibrator 30 having multiple calibration scales 32 34 36 38 and 40 thereon, along with percentage dot comparison targets 50, 52, 54, 56$_5$ and 58.

FIG. 3 shows five different single color output (the single "target" color generally being the color product of the combination of the three or four individual colors available from the imaging system, e.g., cyan, magenta, and yellow) charts 32, 34, 36, 38 and 40 and shows percentage dot representations 50, 52, 54, 56, and 58 as circular images of half tone color densities with holes 60 therein to allow the proof 2 to be displayed. The target proof image may be constructed so that the image is designed to fit under the carrier sheet, or with a second layer 4 behind the proof 2, with the image on the proof 2 arranged in appropriate locations with respect to specific openings in the series of charts and dot comparisons. Various dot values may be arbitrarily chosen as in the figures with 6, 25, 59, 75, and 100% dots.

The visual calibrators of the present invention may also contain other indicators or comparison charts such as line pairs, concentric rings, etc. as known in the art.

What we claim is:

1. A visual calibrator for a digital color imaging proof system comprising a series of patches on a carrier layer, said patches composed of combinations of at least two colors in halftone or continuous print, and associated with at least some of the patches are alphanumeric markings which relate to specific changes in an imaging signal for adjustment of the imaging system to modify the color of a proof towards a desired target color.

2. A calibrator sheet comprising more than one visual calibrator as described in claim 1.

3. The calibrator of claim 1 in which the alphanumerics direct specific signal alterations for a thermal imaging system for at least one color signal selected from the group consisting of cyan, magenta, yellow, and black.

4. The calibrator of claim 1 wherein said patches extend to an edge or hole on said carrier layer.

5. The calibrator sheet of claim 2 where at least one target color extends to an edge or hole on said separate carrier.

6. The calibrator of claim 1 wherein said alphanumerics contain specific instructions for the adjustment of the imaging system to alter an energy output of that system.

7. The calibrator of claim 2 wherein said alphanumerics contain specific instructions for the adjustment of the imaging system to alter the energy output of that system.

8. The calibrator sheet of claim 5 wherein said alphanumerics contain specific instructions for the adjustment of the imaging system to alter the energy output of that system.

9. The calibrator sheet of claim 2 wherein there are also single color halftone images representing specific percentages of halftone dots, with holes available in the halftone images for viewing a proof.

10. The calibrator sheet of claim 5 wherein there are also single color halftone images representing specific percentages of halftone dots, with holes available in the halftone images for viewing a proof.

11. The visual calibrator of claim 1 having holes in said carrier which extend to said patches and a second layer beneath said holes which can support a proof.

12. The calibrator sheet of claim 2 having holes in said carrier which extend to said patches and a second layer beneath said holes which can support a proof.

13. The calibrator sheet of claim 5 having holes in said carrier which extend to said patches and a second layer beneath said holes which can support a proof.

14. The calibrator sheet of claim 8 having holes in said carrier which extend to said patches and a second layer beneath said holes which can support a proof.

15. The calibrator sheet of claim 10 having holes in said carrier which extend to said patches and a second layer beneath said holes which can support a proof.

16. The visual calibrator of claim 1 in which the alphanumerics are defined in a look-up table.

17. The visual calibrator of claim 11 in which the alphanumerics are defined in a look-up table.

18. The calibrator sheet of claim 2 in which said imaging system is a thermal transfer imaging system.

19. The calibrator sheet of claim 5 in which said imaging system is an electronically driven imaging system.

20. A visual calibrator for digital color imaging proof systems comprising a series of patches on a carrier layer, said patches composed of combinations of at least three colors in halftone or continuous print, and associated with at least some of the patches are alphanumeric markings which relate to specific changes in an imaging signal for adjustment of an electronically driven imaging system to modify the color of a proof towards a desired target color.

* * * * *